Sept. 26, 1950        E. G. CARL, JR        2,523,278

FEED MECHANISM FOR PROJECTILE ASSEMBLY MACHINES

Filed March 31, 1945        5 Sheets-Sheet 1

INVENTOR.
EMERSON G. CARL JR.

BY

C. E. Herrstrom & H. E. Thibodeau

ATTORNEYS

Fig. 6

Sept. 26, 1950      E. G. CARL, JR      2,523,278
FEED MECHANISM FOR PROJECTILE ASSEMBLY MACHINES
Filed March 31, 1945      5 Sheets-Sheet 3

EMERSON G. CARL, JR.

Sept. 26, 1950      E. G. CARL, JR      2,523,278
FEED MECHANISM FOR PROJECTILE ASSEMBLY MACHINES
Filed March 31, 1945      5 Sheets-Sheet 4

Inventor
EMERSON G. CARL, JR.

INVENTOR.
EMERSON G. CARL JR.
BY
ATTORNEYS

Patented Sept. 26, 1950

2,523,278

UNITED STATES PATENT OFFICE 2,523,278

FEED MECHANISM FOR PROJECTILE ASSEMBLY MACHINES

Emerson G. Carl, Jr., Philadelphia, Pa.

Application March 31, 1945, Serial No. 586,013

1 Claim. (Cl. 86—45)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to the manufacture of small arms ammunition and it has particular reference to machines for assembling the components of jacketed projectiles.

Generally stated, the object of my invention is to improve the mechanism by which jacket blanks and core slugs are fed into such machines for shaping and assembly into complete projectiles.

A more specific object is to provide an improved feed mechanism which assures location of the slug in the jacket in the accurate manner required for proper ballistics of the completed bullet.

Another object is to eliminate the need for mechanical feed fingers in inserting the jacket blanks and core slugs into the machine.

A further object is to eliminate the need for feed finger adjustment and other operation interruptions, and thereby increase the output and efficiency of the machine and attendant personnel.

A still further object is to reduce punch breakage, increase tool life, and decrease the labor required to replace the tools.

Additional objects are to decrease the skill and effort that is required on the part of operators and adjusters of projectile assembling machines, and to enhance the safety of those workers.

In practicing my invention I attain the foregoing and other objects by providing a novel "gravity" type of feed mechanism by which jacket blanks and core slugs may be introduced into bullet assembly machines of the "straight line" and other conventional types in a unique and superior manner. Illustrative embodiments of my invention are shown by the accompanying drawings wherein.

*Illustrative projectile assembling machine*

Figures 1, 2, 3, 4, 5:
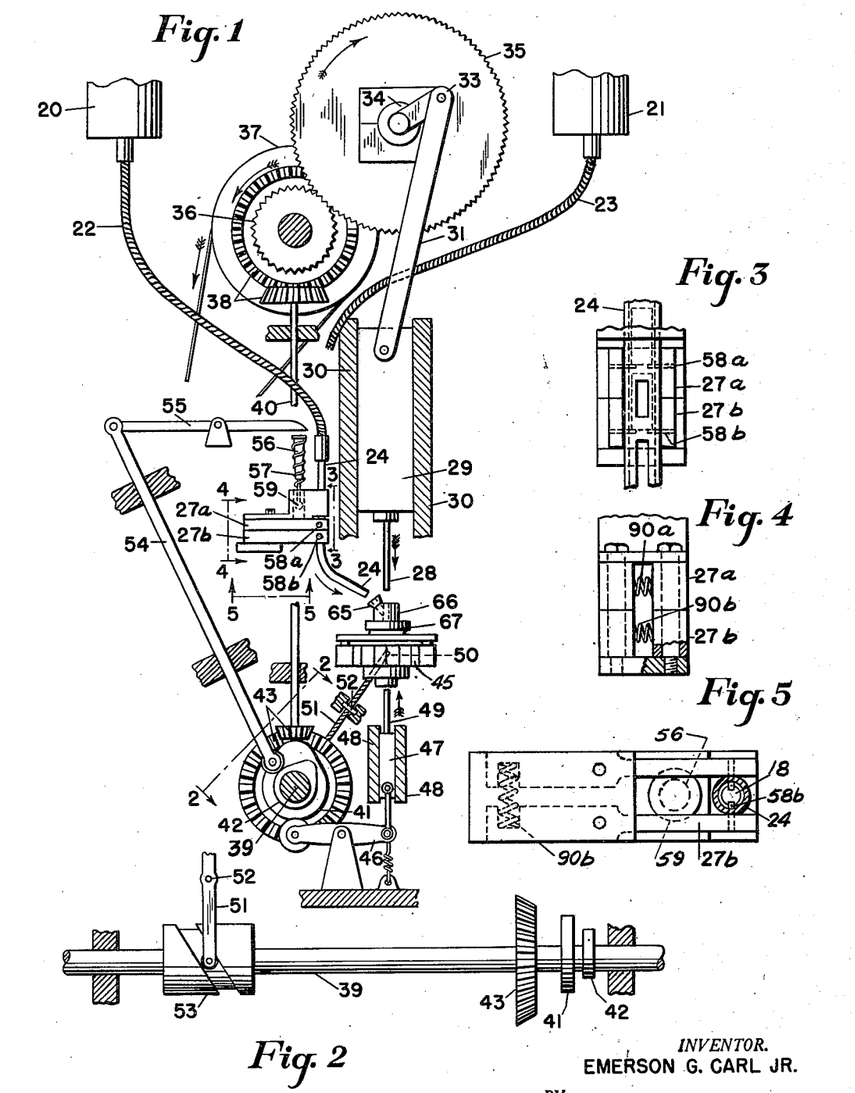
Fig. 1 is a simplified schematic view, partly in section, of one representative machine to which the improvements of my invention may be applied.
Fig. 2 is a view from line 2—2 of Fig. 1, showing the wobble cam by which the machine's transfer mechanism is actuated.
Figs. 3, 4 and 5 are enlarged views from lines 3—3, 4—4 and 5—5 respectively, showing certain details of Fig. 1's jacket blank release mechanism.
Figure 9:
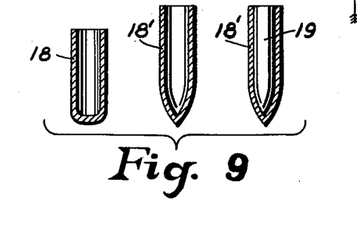
Fig. 9 shows the jacket and slug at various stages of progress through the machine.

The improvements of my invention will here be described as applied to a projectile assembling machine illustratively shown in the drawings as including elements schematically represented by Fig. 1. The function of this machine is to assemble jacket blanks 18 (see Figs. 6-7-8-9) and core slugs 19 (see Figs. 6, 9-10) into completed projectiles for small arms ammunition use.

In the simplified showing of Fig. 1, the blanks 18 are fed from a "pin type" hopper 20 into the machine through delivery tube 22, and the slugs 19 are similarly fed from a "ring type" hopper 21 through a second delivery tube 23. The blanks 18 are so fed as to continuously fill tube 22, and each is advanced closed end first downwardly therethrough by gravity. The slugs 19 are so fed as to continuously fill tube 23, and each is advanced pointed end first downwardly through the tube by gravity.

From delivery tube 22, the jacket blanks 18 pass into a first feed tube 24 (see Figs. 1 and 7) which is positioned directly above and slightly behind the machine's first work station; from delivery tube 23 the slugs 19 similarly pass into a second feed tube 25 (see Fig. 10) which is positioned above and behind a subsequent work station of the machine.

From feed tube 24 the jacket blanks 18 are released one by one at any suitable rate, here assumed to be about 60 per minute; from feed tube 25 the slugs 19 are likewise released one by one and at the same rate. Effecting such releases are release mechanism feed fingers shown at 27 in each of Figs. 1, 3–4–5. A set of these feed finger is provided for each of the two feed tubes 24 and 25.

Each jacket blank and each slug so released enters the machine's work station immediately thereabeneath where it is subjected to an appropriate operation. In the case of the blanks 18, that operation is performed by a jacket punch 28a; in the case of the slugs 19 the operation is performed by a slug punch 28c. These two punches, in cooperation with one or more intermediate jacket pointing punches (only one is here shown at 28b), move downwardly at proper intervals to effect the results which Fig. 9 diagrams. This movement actually is simultaneous on the part of all punches; in Fig. 6, however, pointing punch 28b is for explanatory reasons shown down while jacket and slug punches 28a and 28c are up.

The named downward movement is imparted to punches 28a—28b—28c by a reciprocator 29 to which the punches are mechanically fixed, as indicated in Fig. 1. This reciprocator is slidably mounted for upward and downward movement between stationary guides 30. That movement, in turn, is communicated to the reciprocator by a connecting rod 31 journaled at its upper end to the crank pin 33 of the machine's main crank shaft 34.

In the schematic showing of Fig. 1, rotation is imparted to crank shaft 34 by a main gear 35 driven by a pinion 36 meshed therewith. That pinion, in turn, is rotated by a pulley 37 belt-connected with an electric motor (not shown) or other suitable source of power. Thus driven at some suitable speed, such as about 60 R. P. M., crank shaft 34 repeatedly moves punch reciprocator 29 through its upward and downward range of travel about 60 times each minute.

The complete machine further includes a cam shaft 39 which rotates at the same speed as and in exact synchronism with the main crank shaft 34 just described. In the arrangement shown such synchronous rotation is imparted to the cam shaft from main drive pinion 36 and through a connection which includes a first pair of bevel gears 38, a shaft 40 leading therefrom, and a second pair of bevel gears 43.

Operated by cam shaft 39 (see Figs. 1 and 2) are: (1) the machine's transfer slide 45; (2) a reciprocator 47 by which the machine's several ejector punches 49 are carried; and (3) a release push rod 54 at the jacket and slug supply stations.

Figure 11:
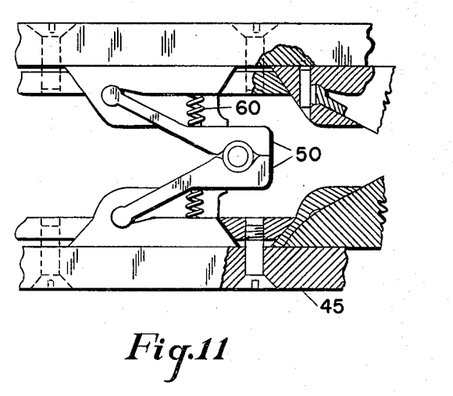
Fig. 11 is a partially sectioned top plan view of certain of the machine's transfer mechanism parts.
Figure 12:
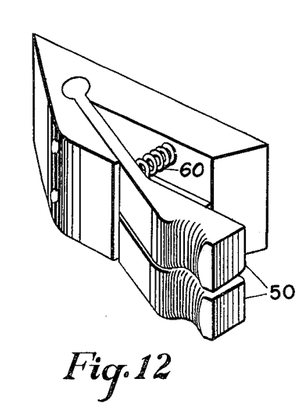
Fig. 12 is a view in perspective of one of the arms of the transfer mechanism shown in Fig. 11.
Figure 13:
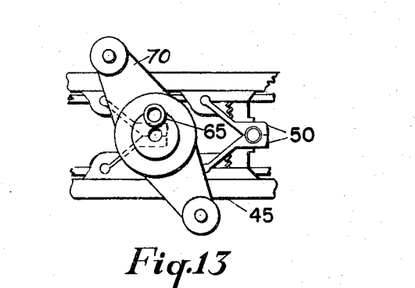
Fig. 13 is a top plan view of certain parts of Fig. 10's slug feeding mechanism showing further details of the transfer apparatus therebeneath.

Transfer slide 45 extends lengthwise of the machine and beneath the several feed punches 28. Its purpose is to advance the jacket blanks 18 and the core slugs 19 through the machine in the direction of from left to right as viewed in Figs. 6, 11 and 13. The back and forth sliding motion necessary to effect this purpose is imparted from a wobble cam 53 carried by cam shaft 39.

As shown in Figs. 1–2 reciprocating motion from cam 53 is transmitted to transfer slide 45 through a drive lever 51 roller-connected at its lower end with the cam, supported near its center by pivot 52, and suitably connected at its upper end with the transfer slide. By means of this linkage slide 45 is moved through its back and forth range of travel once during each rotation of cam and crank shafts 39 and 34. At the machine's illustrative operating speed of 60 R. P. M., this results in 60 movement cycles per minute.

The machine's ejector reciprocator 47 is slidably mounted for upward and downward movement between stationary guides 48. Such movement is imparted thereto by the ejector cam 41 on shaft 39 through a linkage illustratively shown as including a rocker lever 46. The cycle of such movement repeats itself for each rotation of cam and crank shafts 39 and 34, and thus takes place in synchronism with the feed punch and transfer slide movements earlier described.

Once during each shaft rotation cam 41 thus pushes reciprocator 47 upwardly and causes the ejecting punch 49 carried thereby to push the jacket 18 or slug 19 out of the transfer mechanism's feed fingers 50 (see Figs. 1, 6, 7, 10–11–12). Those fingers, in turn, serve to advance the jacket or slug to the next work station, all in a manner more fully described by a later section of this specification.

At each of the jacket and slug supply stations (see Fig. 6) use is made of a release push rod 54 which operates mechanism appropriate for releasing the jackets and slugs one by one and in proper timing with other parts of the machine. These push rods are pushed upwardly once during each rotation of the cam shaft 39 by a lobe on the release cam 42 which rotates with the shaft. Such upward movement is imparted to rocker arm 55, and takes place in proper synchronism with the feed punch, transfer slide and ejector punch movements.

Each time that rocker arm 55 is so acted on, it depresses a tappet rod 56 (Fig. 1) which following the action is re-elevated by a compression spring 57. Such depression forces rod 56's ball end 59 between the upper pair of release fingers 27a and by thus spreading the upper pair of feed stops 58a permits a jacket 18 (or slug 19) to drop down to the lower feed stops 58b.

Continued depression of the tappet rod 56 allows reclosure of the upper stops 58a about the rod's narrow stem, and causes the ball end 59 to spread the lower pair of fingers 27b. The resultant opening of lower feed stops 58b permits the jacket 18 (or slug 19) previously lowered thereagainst to pass downwardly into the lower end of feed tube 24 (or 25). From this point the jacket (or slug) is carried by gravity into the machine's work station below the feed tube, as more fully described by later sections of this specification.

In this manner each depression and re-elevation cycle for tappet rod 56 releases a single jacket 18 (or slug 19) from the continuous line being fed through delivery tube 22 (or 23) from supply hopper 20 (or 21).

The machine's jacket supply station

Figure 6:
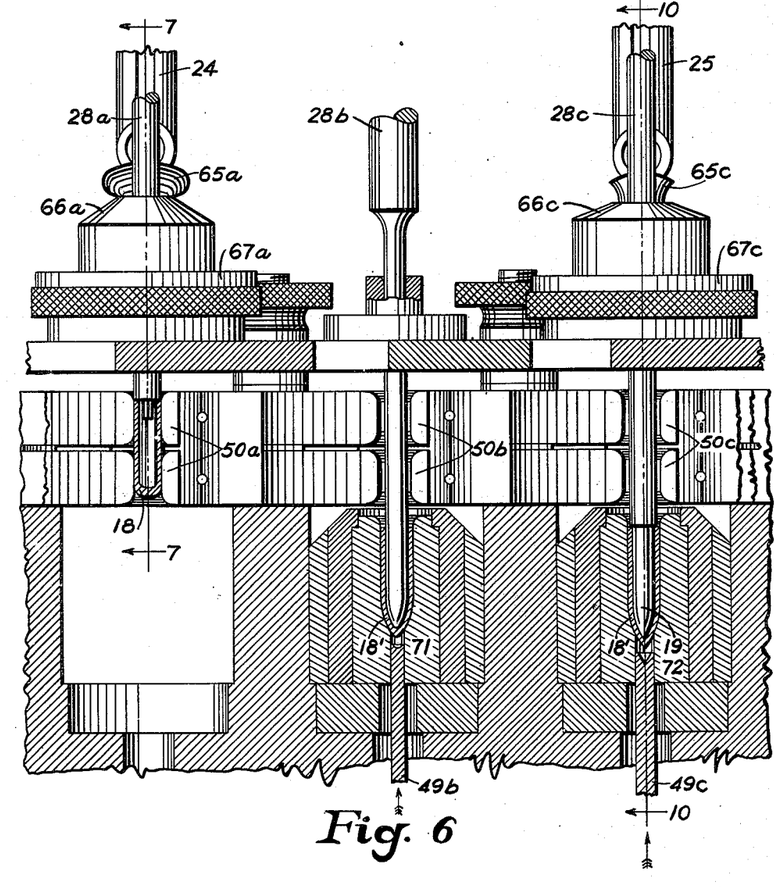
Fig. 6 is a showing, partly in section, of three of the work stations which the complete machine of Fig. 1 includes.
Figures 7, 7A, 8:
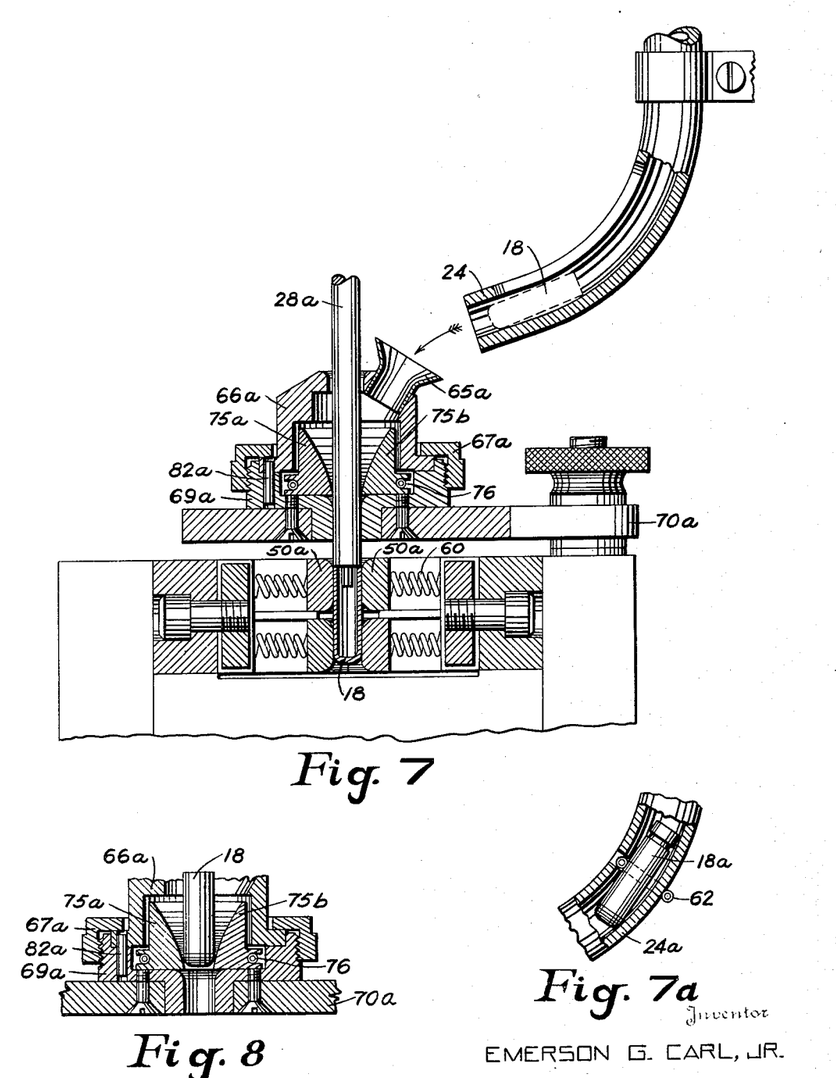
Fig. 7 is a section on line 7—7 of Fig. 6 through my improved blank feeding mechanism at the jacket supply station.
Fig. 7a shows how the curved feed tube of Fig. 7 may be modified to block passage of overlength jacket blanks.
Fig. 8 is a sectional view showing the manner in which the apparatus of Fig. 7 enables the jacket blank to be properly positioned upright between the expansible ring halves.

The station at which jacket blanks 18 are introduced into the machine is shown generally by Fig. 1 and in greater detail by Figs. 6–7. This station is made up of two distinct sections. One, which we may call the jacket feed section, is composed of the pin type hopper 20; the jacket delivery tube 22; the feed tube 24 uniquely bent at its lower end as shown; and the release mechanism consisting of the earlier described release fingers 27 plus the feed stops 58 (see Figs. 1, 3 and 5). The other, which we may term the jacket receiving section, also incorporates the improvements of my invention and has the novel construction shown.

Operation of the jacket feed section's mechanism has in part been described in the earlier given outline of how the entire machine is constructed. In supplement to that earlier explanation, Fig. 3 shows how jacket blanks 18 await their turn in the feed tube 24 above the two sets of stops 58a—58b before being permitted to drop down to the work station therebelow; Figs. 4 and 5 show how springs 90 at the rear of the feed fingers cause return of stops 58a—58b to a closed position after the ball end 59 of the tappet rod 56 (see Fig. 1) passes between the fingers; and later portions of this description explain operation of this part of the mechanism in greater detail.

In the improved form evolved by me, the jacket receiving section consists of a funnel shaped member 65a (see Figs. 1, 6, 7) which receives the jacket 18 from the specially bent feed tube 24; receiver body 66a formed integral with the funnel member and held in fixed position by a knurled nut 67a; plus an expansible ring 75 which stops the jacket blank 18 in a substantially upright position and through which that blank is passed into the machine by feed punch 28a.

Figure 14:
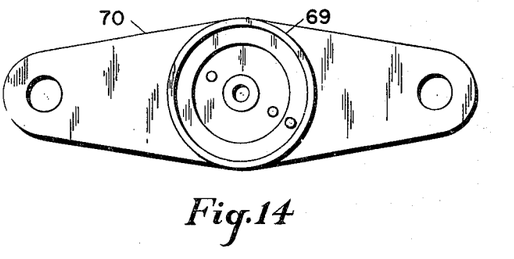
Fig. 14 is a top plan view showing further details of the holder by which the slug or jacket receiver body and feed mechanism funnel are supported.

In the illustrative arrangement shown, the receiver body 66a has the represented central passageway extending vertically therethrough and is fitted into a retaining holder 69a (see Fig. 7). That retaining member is affixed to a support holder 70a bolted to the machine across the top of the work station as shown in Fig. 7. Holder 70a thus supports all receiving parts of the jacket supply station (see Figs. 13 and 14) in fixed relation both to the machine and to the jacket feed tube 24.

Figure 16:
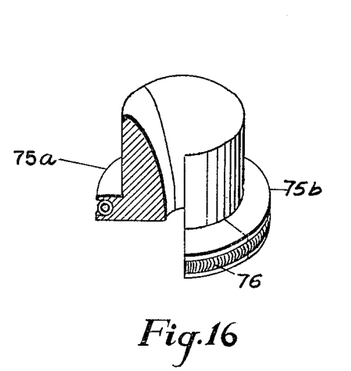
Fig. 16 is a similar view showing further details of the expansible ring which forms part of the Figs. 7-8 jacket feed mechanism.

From the receiver body 66a each jacket blank 18 is fed into the expansible ring 75 by which it is stopped and maintained upright in proper position to be struck by the feed punch 28a. One preferred construction for this ring is shown by Fig. 16 as utilizing two expansible sectors 75a—75b held together by a coiled spring 76 supported in tension in a groove extending completely around the periphery of the two sectors. When contracted together the central opening defined by these sectors is slightly less than the diameter of the jacket blanks 18 that are passed therebetween.

During downward movement, the feed punch 28a strikes the jacket blank 18 forcing it through the expansible ring 75 and into the fingers 50 of the transfer mechanism therebeneath. Upon upward return movement of the feed punch these fingers retain the jacket blank therebetween and in the position which Fig. 6 shows at 18.

The machine's transfer mechanism

Carriage of the jacket blanks 18 and the slugs 19 to successive work stations in the machine is effected by transfer mechanism illustratively shown as consisting of a transfer slide 45 made up of a number of feed fingers 50 (see Figs. 1, 11, 12, 13) which clamp the work securely upright, but separate against springs 60 when struck by the feed punches 28 and the ejector punches 49 to accept or eject the work as required.

This transfer slide 45 reciprocates in a horizontal plane under the earlier described action of wobble cam 53. This moves each set of feed fingers 50 back and forth between adjacent work stations. Such movement effects proper transfer of the work, then returns the fingers to receive the next piece to be moved in continuous succession.

By means of the levers, gears and cams already described by reference to Figs. 1–2, the transfer mechanism is coordinated and timed to pass one jacket or slug each second from one work station to the next. This timing is such that the downwardly moving punch 28 strikes the work just after it has been brought into the corresponding work station. As the feed punch withdraws, the ejecting punch 49 advances upwardly to remove the work in time to permit the transfer mechanism's succeeding set of feed fingers 50 to receive that work for transfer to the succeeding station.

The core slug supply station

Figures 10, 10A:
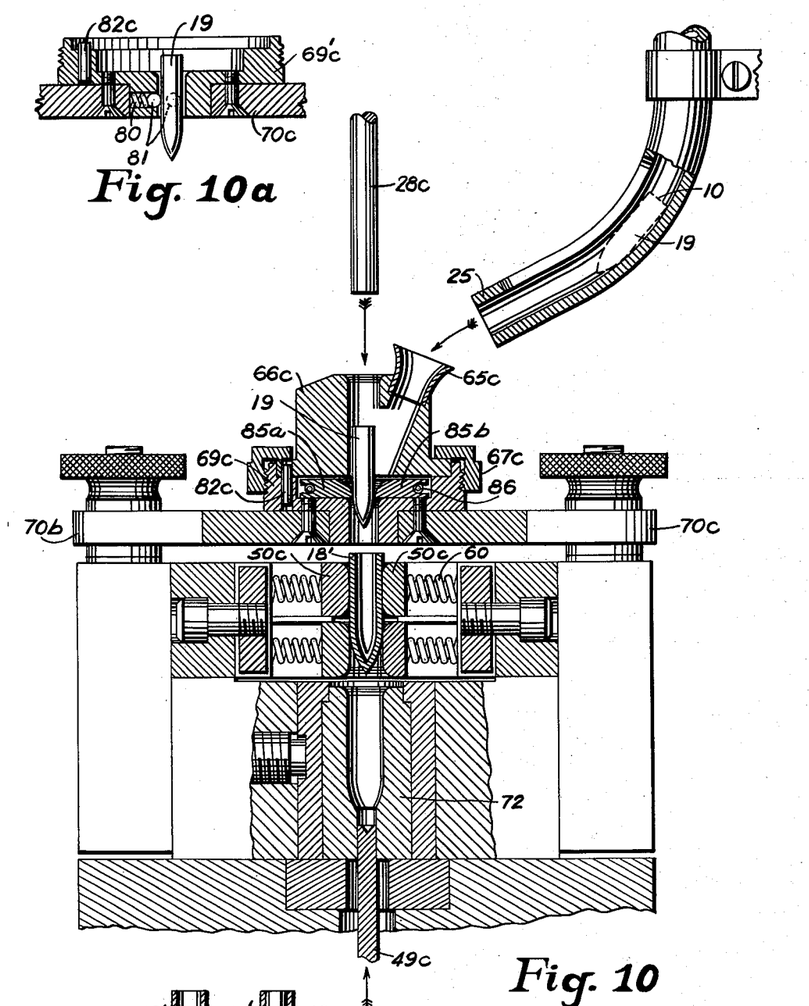
Fig. 10 is a section on line 10—10 of Fig. 6 through my improved slug feeding mechanism at the corresponding supply station.
Fig. 10a shows how the retaining holder of Fig. 10 may be modified to provide a more friction free passage for the core slugs.

The station at which the core slugs 19 are introduced into the machine is shown by Figs. 6 and 10. Like the jacket supply station, this slug supply station is made up of two sections. One, which may be referred to as the slug feed section consists of the ring type hopper 21; the slug delivery tube 23; the feed tube 25 uniquely bent at its lower end as shown; and the release mechanism consisting of the earlier described release fingers 27 plus the feed stops 58 (see Figs. 1, 3 and 5). The other, which we may term the slug receiving section, also incorporates the improvements of my invention and has the novel construction shown.

Operation of the slug feed section's mechanism has in part been described in the earlier given outline of how the entire machine is constructed. The core slugs 19 await their turn in the feed tube 25 above two sets of stops (see Fig. 1) before being permitted to drop down to the work station below (see Fig. 10).

These stops (not shown) and their operating means may exactly duplicate elements 58a—58b with which the jacket blank feed tube 24 of Figs. 1 and 3 is shown as being provided. Since the action in releasing the core slugs 19 one by one exactly duplicates that earlier described for jacket blank release, no further explanation of this part of the mechanism is here deemed necessary.

In the improved form evolved by me, the slug receiving section consists of a funnel shaped member 65c (see Figs. 6 and 10) which receives the slugs 19 from the specially bent feed tube 25; a receiver body 66c held in fixed position by a knurled nut 67c; plus an expansible ring 85 through which the core slug 19 is passed into the machine by feed punch 28c.

In the illustrative arrangement shown, the receiver body 66c has the represented central passageway extending vertically therethrough and is fitted into a retaining holder 69c (see Fig. 10). That retaining member is affixed to a support holder 70c bolted to the machine across the top of the work station as shown in Fig. 10. Holder 70c thus supports all receiving parts of the slug supply station (see Figs. 13 and 14) in fixed relation both to the machine and to the jacket feed tube 25.

Figure 15:
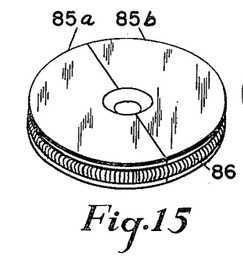
Fig. 15 is a view in perspective showing further details of the expansible ring which forms part of the Fig. 10 slug feed mechanism.

From the receiver body 66c each core slug 19 is fed into the expansible ring 85 by which it is stopped and maintained upright in proper position to be struck by the feed punch 28c. One preferred construction for this ring is shown by Fig. 15 as utilizing two expansible sectors 85a—85b held together by a coiled spring 86 supported in tension in a groove extending completely around the periphery of the two sectors. When contracted together the central opening defined by these sectors is slightly less than the diameter of the core slugs 19 that are passed therebetween.

During downward movement, the feed punch 28c strikes the slug 19 forcing it through the expansible ring 85 and into the pointed jacket blank 18' held between the fingers 50 of the transfer mechanism therebeneath. Further movement of the punch pushes the jacket and slug downwardly into the assembly die 72 where the two components are properly fitted together.

Upon upward return movement of the feed punch 28c, ejector punch 49c forces the thus assembled projectile 18'—19 upwardly between the transfer mechanism's fingers 50c, as Fig. 6 shows. Thus positioned the projectile is passed by that mechanism to succeeding stations and finally down a slide out of the machine and into a receiving hopper (not shown).

The jacket and core release mechanisms

As will now have become evident, the release mechanisms which cause jackets 18 and slugs 19 to be fed one by one into the machine at the jacket and slug supply stations are identical both in construction and in operation.

The continuous chain of jackets 18 in delivery tube 22 and in the upper portion of feed tube 24 and of slugs 19 in delivery tube 23 and in the upper portion of feed tube 25 is arrested by the two sets of stops shown at 58a and 58b in Fig. 3. These stops 58a—58b operate alternately as the release fingers 27a—27b spread, to let one jacket or one slug move downwardly therepast. Opening of the upper stops 58a permits one work-piece to pass; subsequent closure thereof bars others from dropping down. A coordinated opening of the lower stops 58b then feeds the jackets or slug to the work station below the end of feed tube 24 or 25; upon closure thereof the upper stops 58a again open to accept the next piece.

The foregoing cycles of stop and release finger openings are produced by the ball tip 59 of the tappet rod 56. Once during each rotation of the machine's cam shaft 39, this ball tip is pushed downwardly between the upper and lower sets of fingers 27a—27b. This action first wedges apart the upper set of fingers 27a (normally separated by a space less than the diameter of the ball) and thereby spreads upper fingers 58a. Subsequent entry of the ball between the lower set of fingers 58b similarly wedges them apart, at the same time freeing the upper fingers 58a for reclosure about the narrow stem of the tappet rod under the action of a spring 90a compressed between the rear ends of the fingers as shown by Figs. 4 and 5.

Upward return of the tappet rod 56 and ball tip 59 (effected by spring 57) produces a reverse sequence to spread the upper fingers 58a as the lower ones 58b reclose. In this way the one-by-one feeding action is produced.

As earlier pointed out, the release mechanism is geared to and timed with the rest of the machine through rocker arm 55 and push rod 54 which are operated by release cam 42 carried by cam shaft 39. Since that shaft rotates in exact synchronism with the machine's main crank shaft 34, one jacket and one slug are released into the machine's corresponding work stations in proper timing with the descending feed punches 28a and 28c to permit desired operations thereon.

The improved jacket receiving mechanism

In the illustrative form here shown, my improved jacket receiving mechanism is made up of a number of parts uniquely organized into a stationary receiver. This receiver is an important improvement to bullet assembly machines. It eliminates conventional moving parts which require frequent adjustment and often occasion machine breakdown. Details thereof are shown by Figs. 6–7–8.

Each jacket 18 released as aforesaid drops out of the end of feed tube 24 by gravity and enters the receiver body 66a through the opening in funnel shaped members 65a on the receiver's side. From here it further passes down into the receiver's central and vertical passageway and thence still further down into the flared opening of the expansible ring 75a—75b where it is positioned upright. Such positioning is aided by the tension of spring 76 holding the two ring sectors together, as shown in Fig. 16.

The various parts of this jacket blank receiver are kept in stationary assembly by the earlier mentioned retaining holder 69a that is fastened above the machine's work station over the transfer slide 45 (see Fig. 13) by the support holder or plate 79a. The receiver body 66a is located in the operative position shown by a centering pin 82a in the retaining holder 69a, over which it is fastened by nut 67a. The expansible ring 75a—75b is supported with sufficient play therearound to allow for expansion freedom on the part of its two sectors.

From the drawings and description it will be evident that my invention enables the jackets 18 to be received from the feed tube 24 and held in proper position below the feed punch 28a, without conventional moving parts or feed fingers being necessary to bring the jackets to the station to be worked upon. Such elimination of moving parts avoids waste of time and labor for adjustments. Wear of certain moving parts previously needed is eliminated, and the exact location of the slug in the jacket necessary for proper ballistics is guaranteed by the fact that the receiver which I have invented holds the bullet components in a single fixed position.

Optionally the delivery tube 24 at my improved jacket feed station may be arranged to block passage of untrimmed oversize jacket blanks of the type shown at 18a in Fig. 7a. The specially devised delivery tube 24a of that figure prevents such excessively long blanks from entering the machine. This tube utilizes: (a) a notch cut into the wall thereof on the inner side of the tube's bend at approximately the point of greatest curvature; and (b) a coil spring 62 encircling the tube and firmly held by its own tension in place as shown.

The effect of spring 62 is to reduce the diameter of the available passageway for the jacket blanks at that point. Sufficient room is left to permit normal sized blanks 18, but not oversized blanks 18a, to pass by the spring. The oversized jacket blanks 18a, being too long to make the turn in the delivery tube, are pinned tangentially against the tube wall at one point by the spring 62, and at two others by the tube wall on the opposite side.

The importance of the above described improvement will be evident from the fact that entrance of oversized jacket blanks 18a into the machine can be the source of various machine breakdowns. This uniquely constructed delivery tube 24a prevents the oversized blanks from entering the machine. It also facilitates their removal. The operator need only stop the machine momentarily, raise the coil spring 62 slightly, and catch the oversized jacket 18a as it drops out of the tube.

*The improved slug receiving mechanism*

In the illustrative form here shown my improved slug receiving mechanism is made up of a number of parts very similar to those in the improved jacket receiving mechanism described above. These are uniquely organized into a stationary receiver which constitutes an important improvement to bullet assembly machines; it eliminates moving parts which require frequent adjustments and are often the cause of various breakdowns. Details thereof are shown by Figs. 6, 10, 13-14-15.

Each slug 19 released as aforesaid drops out of the end of feed tube 25 by gravity and enters the receiver body 66c through the funnel shaped member 65c on the side thereof. From here the slug further passes down into the receiver body's vertically extending passageway and thence into the flared opening of the retaining ring 85a—85b where it is positioned upright. Such positioning is aided by the tension of spring 86 holding the two ring sectors together, as shown in Fig. 15.

The various parts of this core slug receiver are kept in stationary assembly by retaining holder 69c fastened above the machine's work station over the transfer slide 45 (see Fig. 13) by support holder or plate 70c. The receiver body 66c is located in the operative position shown by a centering pin 82c in the retaining holder 69c, over which it is fastened by a nut 67c. The expansible ring 85a—85b is supported with sufficient play therearound to allow for expansion freedom on the part of its two sectors.

It will be evident from the drawings and descriptions that my invention enables the slugs 19 to be received from the feed tube 25 and held in proper position below the feed punch 28c without moving parts or feed fingers being necessary to bring the slugs to the station to be worked upon. Such elimination of moving parts avoids waste of time and labor for adjustments. Wear of certain moving parts previously needed is eliminated, and the exact location of the slug in the jacket for proper ballistics, as previously mentioned, is guaranteed by the fact that my improved receiver holds the bullet components in a single, fixed position.

Optionally the retaining holder 69c of my improved core slug receiver may be modified as shown at 69'c in Fig. 10a. There this holder has an enlarged central opening and is provided with three or more ball shaped members 81 arranged as shown to be contactable with the slugs 19 passing through the opening and thereby reduce the friction incident to that passage. These ball members are equally spaced around the inner circumference of the holder 69'c through which each slug 19 passes in entering the machine. Springs 80 behind the balls exert sufficient pressure to properly center the slug as feed punch 28c forces it downwardly into transfer fingers 50c.

This modification is especially valuable where the slugs used are of steel or other hardened, non-self-lubricating metal. Slugs made of lead or similar soft, lubricating metals, occasion friction and wear on the holder 69c sufficiently small as ordinarily not to require use of this supplemental feature.

*Operation of the complete machine*

The manner in which the complete machine operates will have become more or less evident from the foregoing description of the machine's component parts. As already pointed out, the coordination among the several cams and gear arrangements is such that the cycle of each operating mechanism has the proper timing with respect to all cooperating mechanisms and parts.

The illustrative machine's operating speed of about 60 R. P. M. is transmitted alike to: (a) the main drive shaft 34 which works the feed punches 28; and (b) the cam shaft 39 which works the ejecting punches 49, the transfer slide 45 and the tappet 56 for the release mechanisms. This permits the punches 28 and 49 to alternately enter the machine's work stations approximately once each second, and there to act upon the jackets 18 and slugs 19 which are released from feed tubes 24 and 25 at the named rate. This means that the machine is capable of assembling approximately 60 complete projectiles per minute.

At the first work station, shown at the extreme left of Fig. 6, jacket blanks 18 are brought into the machine through my improved jacket receiver. Each blank so entering the receiver is pushed through expansible ring 75a—75b (see Fig. 8) by downward movement of feed punch 28a and into feed fingers 50a (see Fig. 7) of the transfer mechanism therebeneath.

Moving with transfer slide 45, these fingers 50a now carry the blank 18 to the right in Fig. 6 to the machine's second work station. Here the next downward movement of pointing punch 28b forces the blank still further down and into a pointing die 71 (see Fig. 6) where it is simultaneously drawn and pointed into the shape shown at 18' in Fig. 9. As punch 28b is withdrawn upwardly, transfer fingers 50a return to the left in Fig. 6 to the machine's first work station. At the same time ejector punch 49b moves upwardly carrying the pointed jacket 18' into the transfer fingers 50b.

Moving with transfer slide 45, these fingers 50b next carry the pointed blank to the right and to the machine's third work station. In Fig. 6 this position is shown at 50c directly beneath the improved core slug receiver of my invention. Here the next downward movement of slug feed punch 28c pushes a slug 19, previously dropped into expansible stripping ring 85a—85b (see Fig. 10), down through that ring and into the pointed jacket blank 18' therebeneath. Continued downward movement of punch 28c forces the slug and jacket into assembly die 72 where these two parts are fitted together as shown at 18'—19 in Fig. 9.

As slug punch 28c is withdrawn upwardly transfer fingers 50b return to the left in Fig. 6 to the machine's second work station. At the same time ejector punch 49c moves upwardly carrying the assembled projectile 18'—19 into the transfer fingers 50c. Succeeding cycles of operation carry this projectile still further to the right in Fig. 6 where further operations involving trimming, etc. (not shown) are performed thereon.

Each core slug 19 entering the machine through the improved slug receiver of my invention is by it positioned so exactly over the pointed jacket blank 18' therebeneath that accurate assembly of the projectile is at all times assured.

Summary

My here shown improvements in jacket and slug feed mechanisms for bullet assembling machines thus assure the desired ballistic perfection of the finished projectiles; they also lower machine repair and reduce lost production time occasioned by adjustment and synchronization of moving parts; and they further enhance the safety of machine operators and adjusters by eliminating sliding fingers and their breakage.

Previously use was made of sliding feed fingers (not here shown) which were timed to grasp a jacket or slug as it dropped out of the feed tube, and mechanically to hold same in place in the work station just long enough to be struck by the station's feed punch. Such sliding feed fingers were subject to frequent misalignment which, in turn, resulted in the slugs being improperly located in the jackets; often, moreover, the punches or fingers would be bent or broken through the former striking the latter rather than the work held thereby.

My improved jacket and slug receivers, being stationary and having no moving parts except the expansible rings, assure exact location of the slugs in the jackets without variation. Tool life is greatly increased as the various sources of tool injuries existing in the numerous moving parts of the old type feeding mechanism are entirely eliminated. Likewise, since my improved receivers require no additional adjustment subsequent to installation, production interferences and time wastages in making repairs are done away with.

Further advantages include a marked decrease of skill and effort required of machine operators and adjusters. Misalignment of the old type feed fingers made necessary their repair or replacement which involves an operation averaging four hours for a skilled mechanic. The single, fixed position of my improved receiver obviates any such time-consuming operations. Should replacement of any part or parts become necessary, such may be done with a minimum of skill and adjustment being required. Moreover, all parts can be assembled in only one position with relation to the support holder 70 which is permanently fixed in place upon the machine (see Figs. 7, 10, 13–14). The receiver body 66 is held in only one position upon the retaining holder 69 by the nut 67. No fine adjustments are necessary.

The straight line or other conventional types of bullet assembly machines can make use of the improved design here disclosed, regardless of caliber size, as substantially the only changes necessary are in the selection of machine part sizes suited to the caliber and other dimensions of the projectiles to be assembled.

As compared, moreover, with the conventional "feed finger" mechanisms which they replace, the improved component receivers of my invention are: (a) more compact and hence occupy less space in the machine; and (b) occasion no operating cams or slides and hence make still further machine space available. In consequence, certain conventional "straight line" projectile assembly machines can, when my improvements are applied thereto, be adapted for substantially increased effectiveness of each and every work station. With "feed finger" type receivers this is less readily possible because of the crowding that the greater size and number of operating parts occasion.

My inventive improvements are therefore extensive in their adaption and hence are not to be restricted to the specific form here disclosed by way of illustration.

I claim:

In a reciprocating punch press machine for acting on ammunition projectiles wherein use is made of a tube through which projectile components are delivered to a machine and also of means operated by the machine for releasing said components one by one from said tube, the combination of a plate-like support member removably secured to said machine so that an opening through the support member is immediately above and aligned with one of the machine's work stations; a cup-shaped holder fastened to said support member and having a central opening through its base concentric with the opening in said support member and further having two step-like shoulders in its inner wall; an expansible ring for engaging each said component and stopping same in an upright position loosely seated in said holder on the shoulder adjacent the holder base and concentric with the holder's central opening; a receiver body seated on the other holder shoulder and having: a central vertical opening therethrough concentric with the center of said ring, a bell-mouthed but progressively tapered opening extending at an angle into confluence with the vertical opening for receiving each projectile component released from said tube, and a slot that radially extends up into the part of the body that rests on the holder shoulder; a centering pin carried by said holder beneath the receiver body and protruding upwardly into engagement with the slot in said body thereby to restrain the body from rotative movement with respect to said holder and to said tube; a restraining nut encircling said body and threadedly secured to said holder for removably retaining said receiver body and expansible ring in the described relationships; and a punch movable by said machine downwardly into said receiver body's central vertical opening and there effective to push each said uprightly positioned component downwardly through said ring.

EMERSON G. CARL, JR.

REFERENCES CITED

The following references are of record in the file of this patent:

UNITED STATES PATENTS

| Number | Name | Date |
|---|---|---|
| 1,138,245 | Parsons | May 4, 1915 |
| 1,332,538 | Bourque | Mar. 2, 1920 |
| 1,696,257 | Rock | Dec. 25, 1928 |
| 2,327,936 | Slater | Aug. 24, 1943 |
| 2,364,243 | Riddle | Dec. 5, 1944 |